(12) United States Patent
Bertz et al.

(10) Patent No.: US 10,067,839 B1
(45) Date of Patent: Sep. 4, 2018

(54) CONTENT OBJECT BACKUP BETWEEN USER EQUIPMENT

(71) Applicant: Sprint Communications Company L.P., Overland Park, KS (US)

(72) Inventors: Lyle T. Bertz, Lee's Summit, MO (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 493 days.

(21) Appl. No.: 14/708,178

(22) Filed: May 8, 2015

(51) Int. Cl.
| | |
|---|---|
| *G06F 17/30* | (2006.01) |
| *G06F 11/14* | (2006.01) |
| *H04W 72/04* | (2009.01) |
| *H04W 76/02* | (2009.01) |
| *H04W 76/10* | (2018.01) |

(52) U.S. Cl.
CPC .... *G06F 11/1458* (2013.01); *G06F 17/30312* (2013.01); *H04W 72/0406* (2013.01); *H04W 76/02* (2013.01); *H04W 76/10* (2018.02); *G06F 2201/805* (2013.01)

(58) Field of Classification Search
CPC .......... G06F 11/1458; G06F 17/30312; G06F 2201/805; H04W 76/10; H04W 76/02; H04W 72/0406
See application file for complete search history.

(56) References Cited

U.S. PATENT DOCUMENTS

| | | | |
|---|---|---|---|
| 9,384,098 B1 * | 7/2016 | Smith | G06F 9/4411 |
| 2015/0154206 A1 * | 6/2015 | Sanjeev | G06F 21/6245 |
| | | | 707/665 |

* cited by examiner

*Primary Examiner* — Scott A Waldron
*Assistant Examiner* — Andalib FT Lodhi

(57) ABSTRACT

A user equipment (UE) includes a radio transceiver, a hardware processor and non-transitory storage device. The radio transceiver is to wirelessly couple the UE to a network. The hardware processor couples to the radio transceiver. The non-transitory storage device is coupled to the hardware processor and stores a content object, a group profile data that identifies another UE as a member of a backup group, and a backup content application which, when executed by the hardware processor, causes the hardware processor to access the group profile data to identify another UE and initiate copying of at least a portion of the content object to the identified UE of the backup group.

16 Claims, 14 Drawing Sheets

US 10,067,839 B1

CONTENT OBJECT BACKUP BETWEEN USER EQUIPMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices have become intertwined in our daily lives. Such devices are typically used to take digital photographs and record video, download and playback music and video, view and create emails and text messages, and other such activities. Such content may be stored in the device itself. As such, a mobile communication device may store numerous photographs (e.g., family vacations, children's school events, etc.), music and movies, and other content of value. Because content stored on the mobile communication device may have significant economic and/or sentimental value, the user of the device naturally would not want to lose such content. However, mobile communication devices typically are easily lost or damaged. As a result, there is an elevated and unacceptable risk that the content on the device may be permanently lost.

SUMMARY

In at least one embodiment, a user equipment (UE) includes a radio transceiver, a hardware processor and non-transitory storage device. The radio transceiver is to wirelessly couple the UE to a network. The hardware processor couples to the radio transceiver. The non-transitory storage device is coupled to the hardware processor and stores a content object, a group profile data that identifies another UE as a member of a backup group, and a backup content application which, when executed by the hardware processor, causes the hardware processor to access the group profile data to identify another UE and initiate copying of at least a portion of the content object to the identified UE of the backup group.

In accordance with another embodiment, a UE also includes a radio transceiver, a hardware processor and non-transitory storage device. The non-transitory storage device couples to the hardware processor and contains a plurality of partitions including a primary partition and a backup partition. Content is caused to be obtained by a user of the UE and is stored in the primary partition and accessible to the user. However, backup content received from another UE is stored in the backup partition and is inaccessible to the user. The non-transitory storage device includes a backup content application that, when executed by the hardware processor, causes the hardware processor to receive at least a portion of a content object from another UE and store the received at least a portion of the content object in the backup partition.

In accordance with yet another embodiment, a method includes receiving, by a hardware processor, a backup request from a primary user equipment (UE). The backup request identifies another UE to be included in a backup group to thereby function, at least in part, as backup storage for the primary UE. The method further includes transmitting, by the hardware processor, a backup invitation message to the other UE and receiving, by the hardware processor, a response from the other UE as to whether a user of that UE agrees for that user's UE to be in the backup group.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
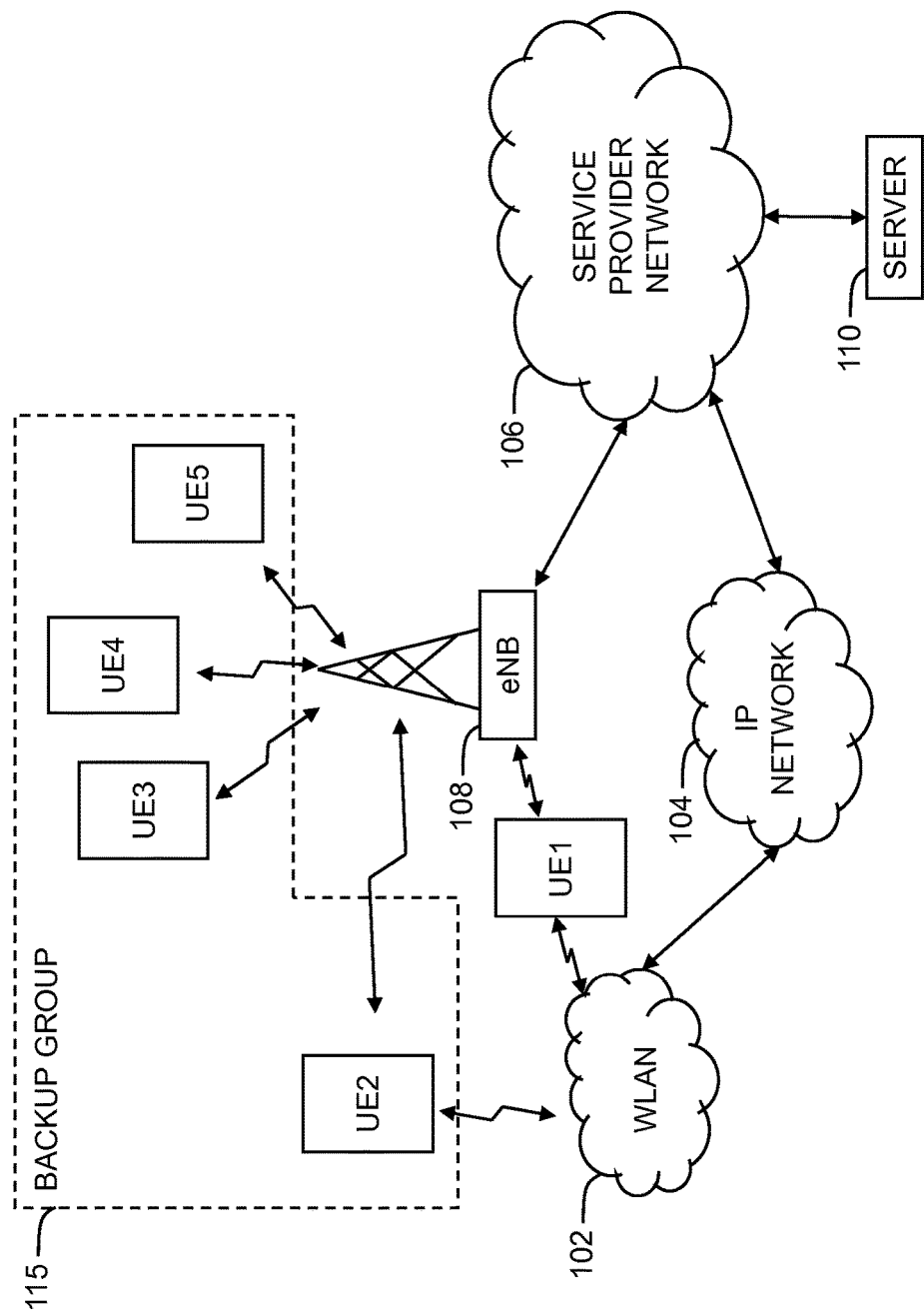
FIG. 1 illustrates a system diagram showing the use of backup group of user equipment (UE) to provide backup storage for another UE in accordance with various embodiments.

It should be understood at the outset that although illustrative implementations of one or more embodiments are illustrated below, the disclosed subject matter may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As noted above, content stored on user equipment (UE) is subject to being permanently lost due to, for example, theft or misplacement of the UE, damage to the UE from being dropped on the ground or in water, etc. In accordance with various embodiments, UEs may be used to provide backup storage for each other. As such, a primary UE may cause at least some of its content to be copied to one or more other UEs in a "backup group." The primary UE may include software executable for this purpose. The backup group is associated with, and provides backup storage for, a particular UE in accordance with at least some examples. In some implementations, users of the UE members of the backup group may be prompted to grant their permission for their respective UEs to be used as backup storage for the primary UE whose content is to be copied to the backup group. Each backup group member UE may include software executable to receive and store content from the primary UE as well as to grant or deny permission to be used as backup storage. A server (also with suitable software) may facilitate the creation of the backup groups to solicit permission, for example, from each candidate backup UE to be used as backup storage.

The content from the primary UE may be provided to the backup group UEs through the "edge" of a network, that is, without provided through a cellular service provider's own core network (e.g., the content may be carried by the service provider's radio access network (RAN) nodes, such as cell towers, and/or media access gateway (MAG) servers in the RAN or proximate to the RAN). The content to be backed up may be stored in one backup UE or may be "striped" across multiple UEs in a backup group. Provisions are included in the event one or more of the UE members of the backup group are temporarily or permanently unavailable to be used as backup storage. For example, a group profile may be provided that identifies other UEs that are to be used in the event a backup group UE is unavailable. Further still, deduplication is provided by which a backup group UE is able to detect when it is being tasked with storing content that it already contains.

For example, within a single family of five (two parents and three children), a backup group can be formed to backup content from the father's UE. The backup group for the father's UE may include the UEs of the mother and the three children. As such, the father's UE can backup its content to the other four UEs in the backup group. Any number of UEs (i.e., one or more) may be included in a backup group. If a father takes a picture and shares it with his family, each of them has a copy of the same picture on their UEs. If they are all backing each other up—any one of them may be assigned to hold the picture as part of the backup for several other members. When completing the backup and with the deduplication process, the UE may hold only a single copy of the picture in the backup partition with it tagged for how it is associated with multiple primary devices, and not have multiple copies of the same picture.

Some UEs may function as backup devices to other UEs. The backup UEs, however, may be unavailable from time to time and unavailable on a temporary basis. For example, a UE may have temporarily lost power (e.g., battery has completely discharged), may temporarily have no network connectivity, may be in "airplane" mode, etc. This condition can be detected by the primary UE (e.g., by failing to receive an acknowledgment within a prescribed time period from the backup UE), and when it happens, the primary UE may arrange to have its content backed up to a different UE. When the previously unavailable backup UE again becomes available, the primary UE may switch its backup process to target the again available backup UE.

The term "content" refers to any type of data stored on the UE. Examples of content include photographs, videos, audio (e.g., music), email, contacts, and the like. A "content object" refers to a particular item of content such as photograph, a video, an email file, etc. Further, this disclosure refers to a "primary" UE backing up its content to a backup group. The term "primary" is not intended to impart any special functionality to the UE but merely is intended to make references to the UE initiating the backup and the UE(s) receiving the backup content easy to follow. In some examples, a given UE both may function as a primary UE to have its content backed up to a backup group, and as a member of backup group on behalf of another primary UE.

The verb "backup" refers to making a copy of content on storage other than on the UE that contains the original content. As a result of backing up a particular content object, at least two copies of that content object will exist—one on the primary UE and another on the UE(s) of the backup group. For example, when the father backs up a photograph to his backup group, two copies of the content are present— one on the father's UE and another in the backup group. If, by chance, the father's UE or its content becomes permanently inaccessible, a copy of the content is still present in the backup group and can be retrieved as desired and stored anew on a new UE that the father may purchase or otherwise obtain.

FIG. 1 illustrates various UEs operatively coupled together. Each UE may comprise a mobile communication device such as a mobile phone, a smart phone, a personal digital assistant, a tablet device, a media player, a headset computer, a wearable computer, a personal computer, or another type of device that has connectivity to a network. In some examples, a UE may have one or more types of wireless capability including, for example, WiFi (e.g., IEEE 80211x family of protocols), Bluetooth®, Zigbee, broadband cellular, etc.

The example of FIG. 1 illustrates five UEs-UE1, UE2, UE3, UE4 and UE5—although any number of UEs may be present. The various UEs need not connect to a network in the same way, or even directly connect to the same network. In this example, UE1 and UE2 connect to a wireless local area network (WLAN) 102 via a WiFi protocol. All of the UEs in this example connect to a cellular network using any of a variety of protocols. Examples of such cellular protocols include code division multiple access (CDMA) wireless communication protocol, global system for mobile communication (GSM) wireless communication protocol, a long-term evolution (LTE) wireless communication protocol, a world-wide interoperability for microwave access (WiMAX) wireless communication protocol, or any other suitable wireless communication protocol. UEs 1-5 may send and receive wireless communications to and from one or more cell towers such as an enhanced Node B (eNB) 108.

A cellular service provider may provide a service provider network 106 to which the various eNBs 108 communicate to one or more servers 110 and to each other. The service provider network 106 may include a plurality of switches, routers, software, and other elements to provide connectivity for the UEs 1-5 to the service provider's servers (e.g., server 110), storage, and various services offered by the service provider.

The WLAN 102 may have a communication link to the service provider's network 106 through one or more intermediate networks such as Internet Protocol (IP) network 104. As noted above, UEs 3-5 also may have a communication link to the service provider's network 106 through one or more eNBs 108. As such, the various UEs 1-5 may communicate with each other through the collection of networks 102, 104, 106 and eNB 108, as well as communicate with a server 110 through the service provider network 106.

FIG. 1 also illustrates that UE 2-5 form a backup group 115 usable to operate as backup storage for UE1. Although four UEs (UE2-UE5) form the backup group 115 of UE1, in other examples, UE1's backup group 115 may only include one UE. More broadly, a backup group can include any number of UEs (one or more). Further still, the UEs in the backup group 115 have network connectivity through a variety of different wireless protocols—UE2 wirelessly connects to WLAN 102, while UE 3-5 wirelessly connect to one or more eNBs 108. However, the various UEs in a backup group can connect wirelessly to provide backup storage using the same wireless network and protocol. UE1 and UE2 may be connected to the same WLAN 102 or to different WLANs.

The UEs of the backup group 115 are usable by primary UE1 to store content from UE1 to any one or more of the UEs in the backup group. As will be explained further below, the user of UE1 can select which other UEs to include in the backup group 115. The selected UEs for the backup group can be UEs within the same service provider plan, but need not be. The UEs for the backup group may include UEs of family, close friends, coworkers, etc. Thus, the combination of UEs in the backup group 115 may include UEs within the same service provider plan as primary UE1 and/or UEs from different plans, or all of the UEs in the backup group may be within the same plan, or none of the UEs in the backup group may be part of the same service provider plan as the primary UE1.

In some examples, the content object to be copied to the UEs of the backup group may be transmitted between the relevant primary and backup group UEs without being provided to or through the service provider's network 106 and/or server 110. For example, if the relevant UEs are in communication with an eNB 108, the content object may be transmitted by the primary UE to the eNB 108 and to the backup group UEs. By way of another example, if the relevant UEs are in communication with other via a WLAN 102, the content object may be transmitted by the primary UE to an access point (not shown) of the WLAN 102 and to the backup group UEs. In another example in which some of the relevant UEs are in communication with WLAN 102 while other UEs are in communication with an eNB 108, the content object may be transmitted between the primary UE and the backup group UEs through a combination of WLAN 102 and eNB 108. In such examples, the traffic containing the content object to be backed up does not flow through the core of the service provider network 106 and/or server 110 and thus does not burden the service provider network 106 and/or server from a storage and bandwidth standpoint. The UEs may communicate via nodes in the radio access network (RAN) (such as eNBs) of the service provider and/or via a media access gateway (MAG) server in the RAN or proximate to the RAN.

The server 110 shown in FIG. 1 may provide assistance in forming the UE members of the backup group 115. For example, a user of primary UE1 may select various other UE users from, for example, a contacts list and provide the identities of the proposed UE backup group members to the server 110. The server 110 then can send a backup group invitation message to each potential backup group member to obtain permission from the users of such UEs to have their UE function as backup storage for the primary UE1. The server 110 can also provide messages to the primary UEs indicative of the acceptance/rejection by each candidate UE selected to be in the primary UE's backup group.

Figure 2:
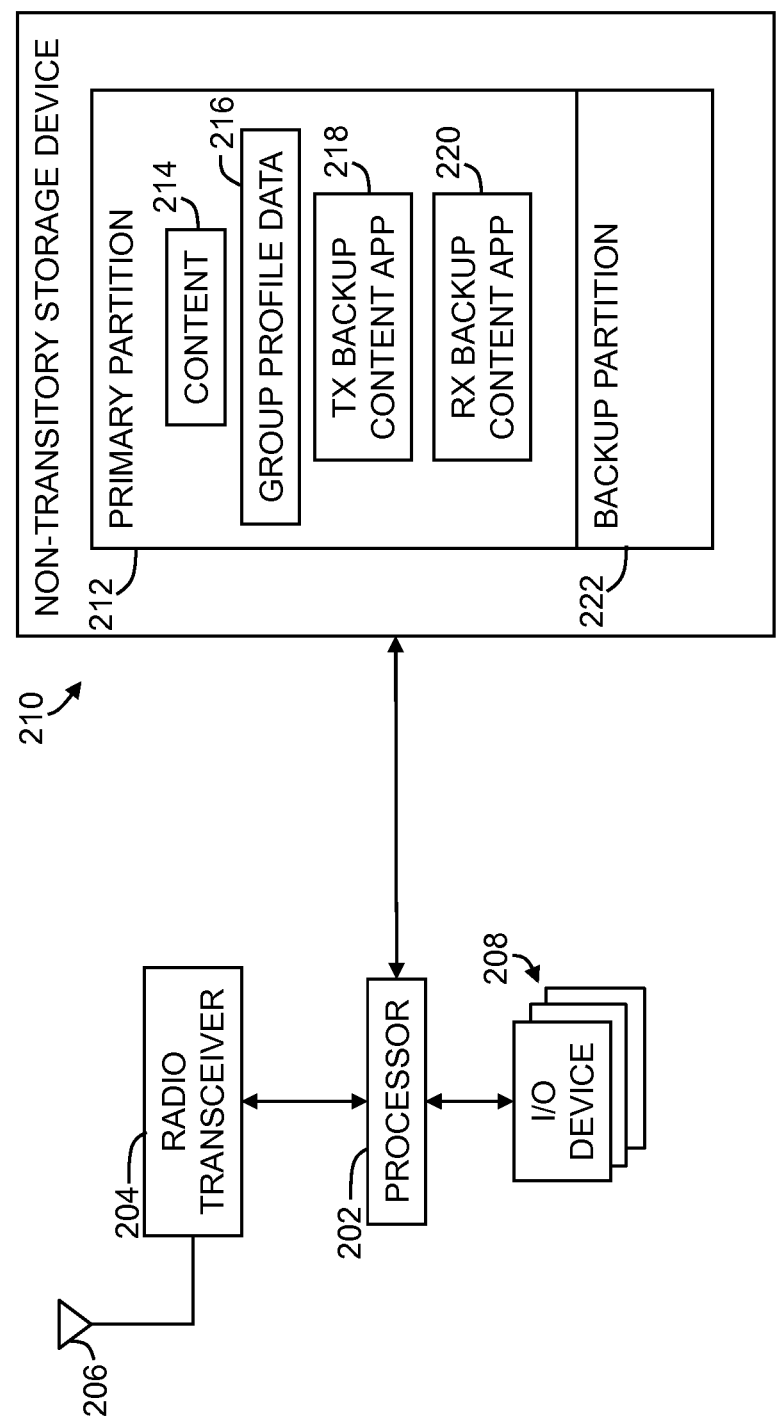
FIG. 2 shows a block diagram of a UE in accordance with various embodiments.

FIG. 2 illustrates a block diagram of a UE. The architecture shown in FIG. 2 may be applicable to all UEs, or the architecture may vary between UEs. The illustrative architecture includes a hardware processor 202 (e.g., microcontroller, microprocessor, digital signal processor, etc.) coupled to a radio transceiver 204, one or more input/output (I/O) devices 208 and a non-transitory storage device 210. Although one processor 202 is shown, any number of processors 202 may be included. Some implementations may include a microcontroller to handle I/O functions and to execute various applications, as well as a digital signal processor (DSP) to perform DSP-related actions such as filtering, data compression, communications, etc.

The radio transceiver 204 provides a wireless physical layer (PHY) for the UE and may provide WiFi, Bluetooth®, cellular, and/or other types of wireless connectivity. The radio transceiver 204 may be implemented as multiple radio transceivers—e.g., one for each type of wireless protocol and/or communication frequency. One or more antennae 206 couple to the radio transceiver 204 for wireless signal transmission and reception. The I/O devices 208 can include any desired type of I/O device such as a display (e.g., touch display), buttons, keys, microphone, speaker, etc.

The non-transitory storage device 210 comprises volatile storage (e.g., random access memory), non-volatile storage (e.g., solid state storage, optical storage, magnetic storage), or combinations thereof. In accordance with various embodiments, the non-transitory storage device 210 includes multiple partitions. In the example of FIG. 2, the UE's non-transitory storage device 210 includes two partitions designated as primary partition 212 and backup partition 222. The primary partition 212 may be used to store content 214 (photographs, music, etc.), group profile data 216, a transmit backup content application ("app") 218 and a receive backup content application 220. The applications 218 and 220 are executable by the processor 202. All references to the applications 218 and 220 implementing various functionality include the processor 202 executing the applications 218, 220. The transmit backup content application 218 operates to access the group profile data to identify one or more backup UE members of a backup group and to initiate copying of at least a portion of content objects from the primary partition 212 to the backup partition(s) 222 of the UE(s) identified in the backup group. The receive backup content application 220 operates to receive content from other UEs for storage in their backup partition 222. The receive backup content application 220 may process the received content before storage in the backup partition 222. An example of processing the received content by the receiving UE is for the receive backup content application 220 to compress, or caused to be compressed, the received content.

The group profile data 216 may specify a group profile that specifies the identity of a UE for which the non-transitory storage device 210 is usable to store backup content objects. That is, the group profile data 216 may include a group profile that identifies other UEs that are to be used as backup storage for the UE containing the group profile data. UEs identified in the group profile of a primary UE may be referred to as backup group "members." The group profile data 216 also may include a group profile that identifies another UE for which the UE containing that particular group profile is to receive and store content objects.

In some examples, information in the primary partition 212 is accessible to the user of the UE, whereas information in the backup partition 222 is not accessible to the user of the UE. In such embodiments, any content stored in backup partition 222 on behalf of another UE is not accessible to the user of the UE containing the backup content. For example, if user A's UE is used to provide backup storage for user B's content, user A cannot access (e.g., view, listen to, etc.) user B's content on user A's UE. In other embodiments, however, backup content from another UE stored in the backup partition 222 of a given UE is accessible to the user of such UE.

A user of a primary UE can specify other users that are to be included in a backup group for the primary UE. For example, a primary UE user can specify through an I/O device 208 (e.g., a touch screen) those persons in a contacts list that the user wishes to be in his or her backup group. When a new or modified content object is obtained in the non-transitory storage device 210 (e.g., content 214) of the primary UE (e.g., by taking a photograph or video, downloading content, etc.), the transmit backup content application 218 causes a copy of such content object to be transmitted to and stored in the non-transitory storage device of the UEs specified in the backup group associated with the primary UE (e.g., in the backup partition 222 of the backup group members). The UE members of a backup group are specified in the group profile data 216. A user of a given primary UE may create one or more backup groups. The group profile data 216 for a given backup group may include, for each backup group member, a unique identifier for that member such as a telephone number, IP address, WiFi handle, etc. The group profile data also may specify the type(s) of content 214 to be stored in a particular backup group. That is, the primary UE may specify that certain, but not all, types of content 214 are to be backed up to the backup group. For example, a primary UE user may specify that only photographs and audio files are to be backed up to the backup group. The transmit backup content application 218 may provide a graphical user interface to the user to select the desired members of a backup group as well as the types of content the primary UE's user desires to backed up as described herein. This selectivity affords the primary UE user control over the backup process pertaining to his/her content.

The receive backup content application 220 causes the UE to receive content from a primary UE and to store such received content in the backup partition 222 of the receiving UE. The received content may be all, or only some, of a given content object. The group profile data 216 may identify the primary UE for which the receiving UE is a backup group member. If desired, the group profile data 216 also may identify the other backup group members for the primary UE.

Figure 3:
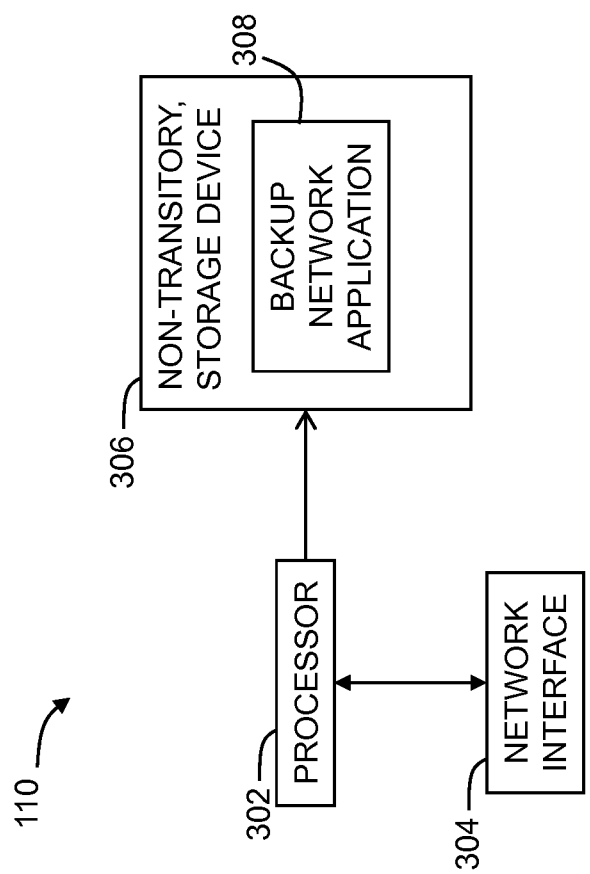
FIG. 3 shows a block diagram of a server in accordance with various embodiments.

FIG. 3 shows an illustrative architecture for server 110 (FIG. 1). In the example shown, the server 110 includes a hardware processor 302 coupled to a network interface 304 and a non-transitory storage device 306. The network interface 304 may be a wired or wireless interface to provide the server with communication connectivity to the service provider network 106, and through that network to the various UEs. The non-transitory storage device 306 may comprise volatile storage (e.g., random access memory), non-volatile storage (e.g., solid state storage, optical storage, magnetic storage), or combinations thereof. The non-transitory storage device 306 includes a backup network application 308 that, when executed by the processor 302, provides the server 110 with some or all of the functionality described herein as attributed to the server 110. All references to functionality performed by the backup network application 308 include the processor 302 executing the backup network application 308.

In some embodiments, the backup network application 308 functions to assist a primary UE to form a desired backup group. In one such example, the primary UE's user selects (e.g., from a contacts list) which other users should be included in the backup group. However, a given user may not want to be part of another user's backup group, or the contact information for a given user may be outdated and thus of no use to be part of a backup group. The backup network application 308 of server 110 functions to help ensure each potential backup group member is available and willing to be part of a backup group for another UE. For example, once a user of a primary UE selects the desired members of the backup group, the primary UE (e.g., the transmit backup content application 218) transmits a backup request message to the server 110. The backup request message identifies the one or more backup group member candidates to be included in the backup group. The server's 110 backup network application 308 then sends backup invitation messages to each of the backup group member candidates inviting each to be part of a backup group on behalf of the user of the primary UE. The identity of the primary UE user may be included in the backup invitation messages. Each backup group member candidate can respond to the invitation message to accept or deny the invitation. If the backup group member candidate accepts the invitation, a group update message is sent from the server to the primary UE informing the user of the primary UE that the candidate has accepted. The group profile data 216 on the primary UE is updated to reflect the inclusion of the new member in the backup group. However, if the backup group member candidate denies the invitation, then a group update message is sent to the primary UE informing the user of the primary UE that the candidate has opted not be part of the backup group. Further still, the server's 110 backup network application 308 sends a response message to the primary UE in the event that the server 110 is unable to contact the backup group member candidate (e.g., the server 110 does not receive a response to the invitation from the candidate accepting or denying the invitation within a threshold timeout period of time). As such, the backup group profile data 216 does not include the identity of the denying user. Instead, the primary UE user may select a replacement candidate, and the server 110 sends an invitation to the replacement candidate.

Figure 4:
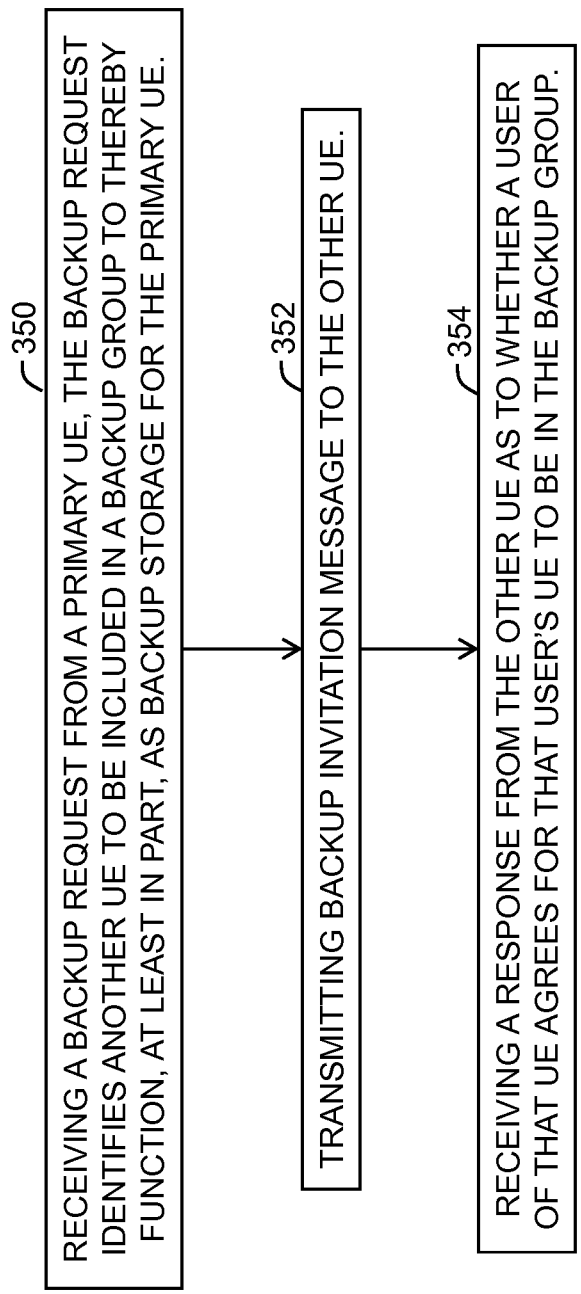
FIG. 4 shows a method to be performed by the server in accordance with various embodiments.

FIG. 4 shows a method to be performed by, for example, the sever 110. The operations depicted in FIG. 4 may be performed by the server's hardware processor 302. At 350, the method includes receiving a backup request from a primary UE. The backup request identifies another UE to be included in a backup group to thereby function, at least in part, as backup storage for the primary UE. At 352, the method further includes transmitting a backup invitation message to the other UE. At 354, the method includes receiving a response from the other UE as to whether a user of that UE agrees for that user's UE to be in the backup group.

Figure 5:
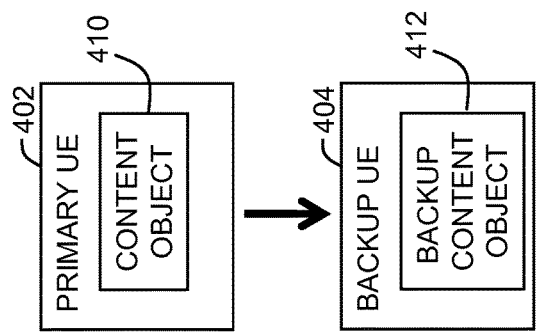
FIG. 5 shows an example of the use of UE as backup storage for a primary UE.

FIGS. 5-10 illustrate various examples of backup groups for a primary UE. In the example of FIG. 5, only one UE is in a backup group for a primary UE. Any content objects 410 on the primary UE 402 are copied in full to the backup UE 404 and stored as backup content objects 412. This arrangement provides data mirroring in that two copies of the content object are created—one on the primary UE 402 and another on the backup UE 404. In one example, the user of the primary UE 402 takes a photograph or downloads a song. As soon as the photograph is taken or song is downloaded, the backup process begins.

Figure 6:
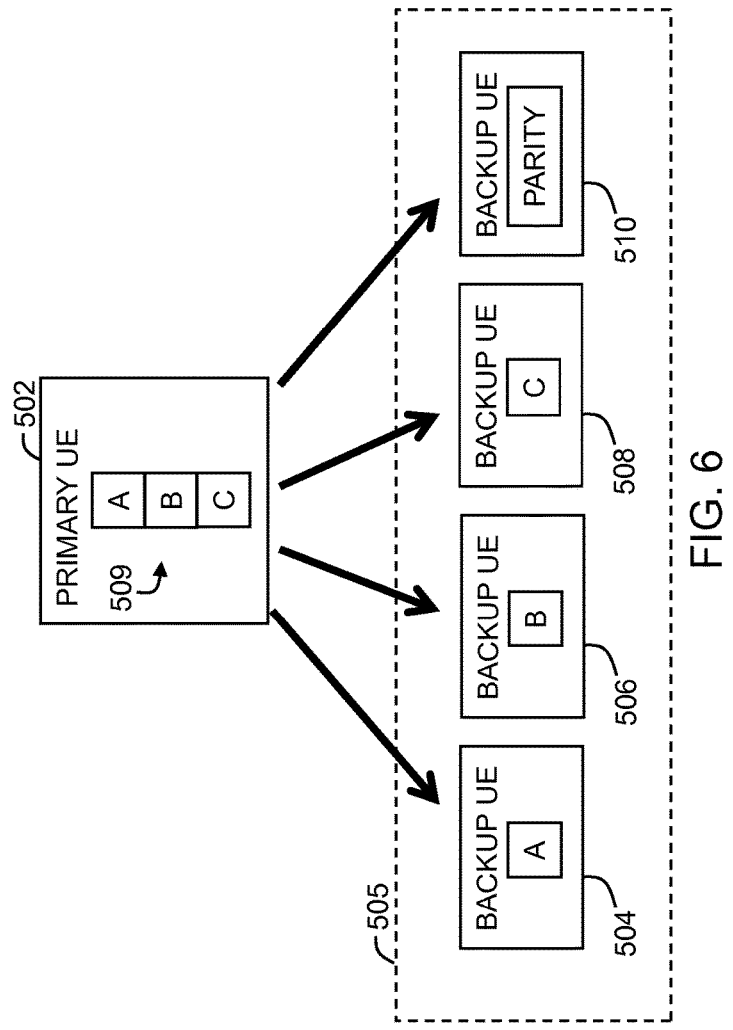
FIG. 6 shows another example of backup group of UEs in accordance with various embodiments.

FIG. 6 shows another example which shows a backup group 505 comprises multiple UEs 504, 506, 508, and 510 functioning as backup storage to the primary UE 502. In this example, four UEs are in the backup group 505, but a different number than four UEs are possible in other examples. The content object 509 to be copied to the backup group 505 (and there may be multiple content objects to be copied) may be "striped" across the various backup group members 504, 506, 508 and 510 of the backup group. That is, the content object 509 is divided into blocks of a particular (e.g., predetermined) length. The example of FIG. 6 shows the content object 509 divided into three blocks A, B, and C. Each block is copied to a specific backup UE. Parity information is computed based on the data blocks A, B, and C. In some examples, the parity information may be computed as the logical exclusive OR of the data of blocks A, B, and C. The data blocks themselves are stored in three of the backup group members (members 504, 506, and 508 in this example) with the parity information stored in a fourth backup group member 510.

In some implementations, one of the backup group members is predetermined to store parity information only. In other implementations, the parity information may be spread across the various backup group member UEs from content object to content object. That is, for another content object, the primary UE may copy its blocks to backup UEs 506, 508, and 510 with backup UE 504 storing parity information for such blocks.

In some examples, a content object may be divided into many more blocks than there are backup group members in the backup group 505. As such, each backup group member may store multiple blocks from the content object of the primary UE 502. In some circumstances, numerous yet smaller block sizes may support faster restoration operations.

Figure 7:
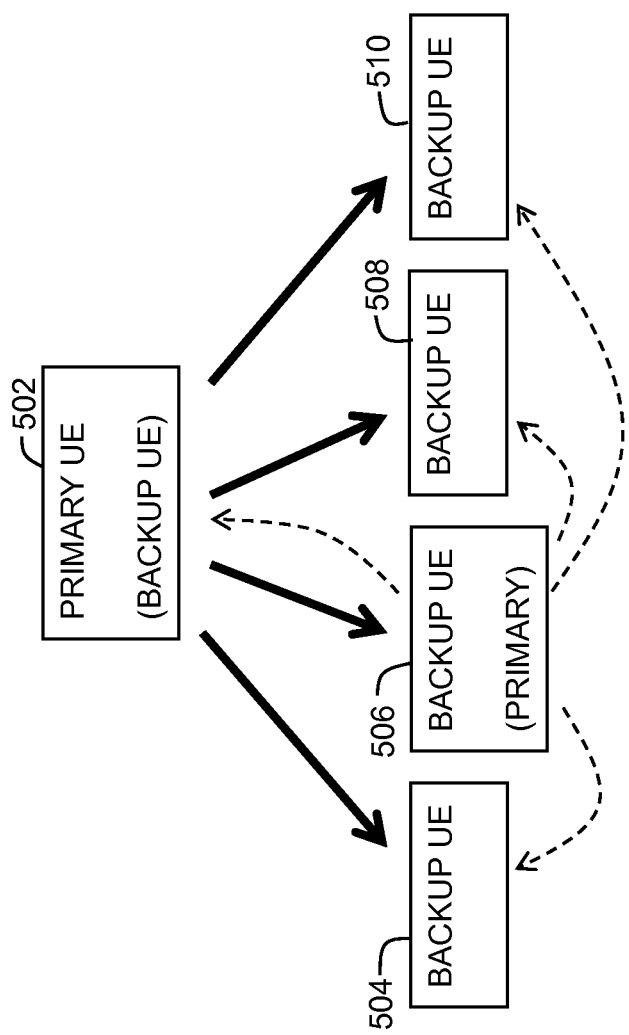
FIG. 7 shows yet another example of two primary UEs and their backup groups in accordance with various embodiments.

The example of FIG. 7 is similar to that of FIG. 6. The primary UE 502 uses backup group members 504, 506, 508 and 510 as its backup group, as indicated by the solid arrows. UE 506 in this example functions as both backup storage for primary UE 502 and also as a primary UE itself. The backup group for UE 506 functioning as a primary UE includes UEs 502, 504, 508, and 510. The dashed arrows illustrate that UE 506 can cause its content to be copied to its backup group members (UEs 502, 504, 508, and 510). In this example, UEs 502 and 506 function as both primary UEs (having their content copied elsewhere) and as a backup UE to a primary UE (permitting their storage to be used as backup storage for another UE). UEs 502 and 506 function to be backup storage for each other. FIG. 7 also illustrates that any given UE can function as backup storage for multiple other UEs. For example, UEs 504, 508, and 510 backup content from both primary UEs 502 and 506. Thus, the receive backup content applications on UEs 504, 508, and 510 receive content objects, or portions thereof, from multiple other UEs for storage in the backup partitions 222 of the UEs 504, 508, and 510.

Figure 8:
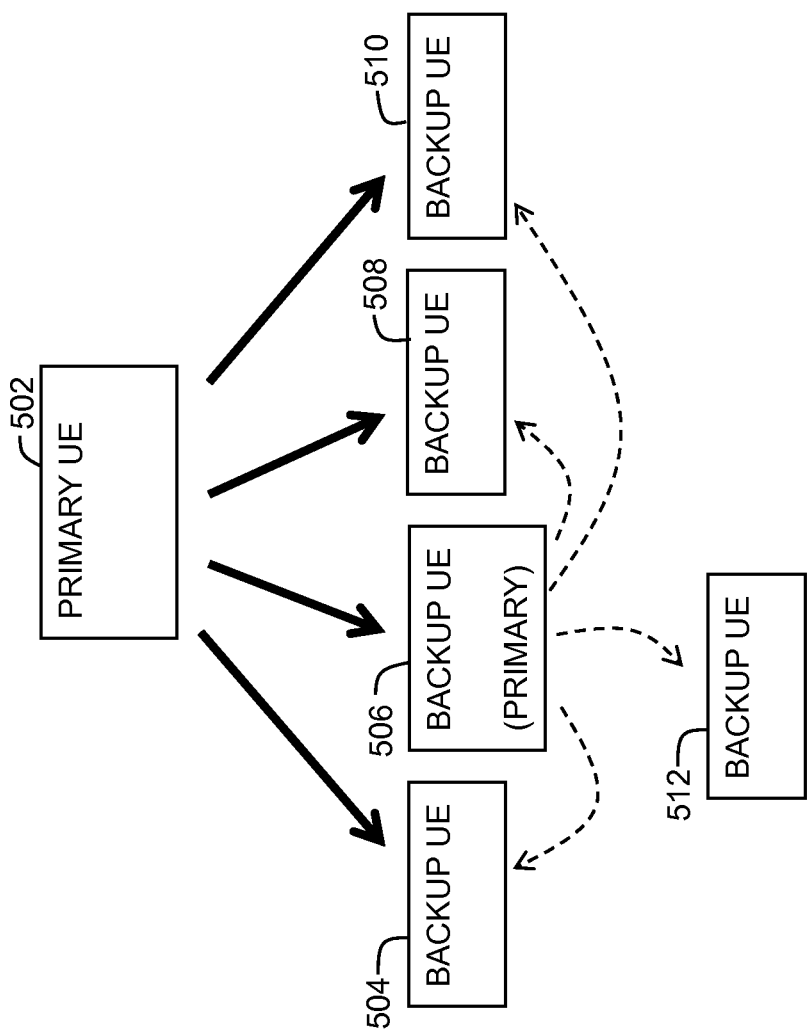
FIG. 8 shows another example of multiple primary UEs and their backup groups in accordance with various embodiments.

FIG. 8 shows an example in which, as before, the primary UE 502 uses backup group members 504, 506, 508 and 510 as its backup group, as indicated by the solid arrows. UE 506 in this example functions as both backup storage for primary UE 502 and also as a primary UE itself. The backup group for UE 506 as a primary UE includes UEs 504, 508, 510 and 512. In this example, the primary UEs 502 and 506 share some backup group members in their backup groups, but do not provide backup storage for each other.

Figure 9:
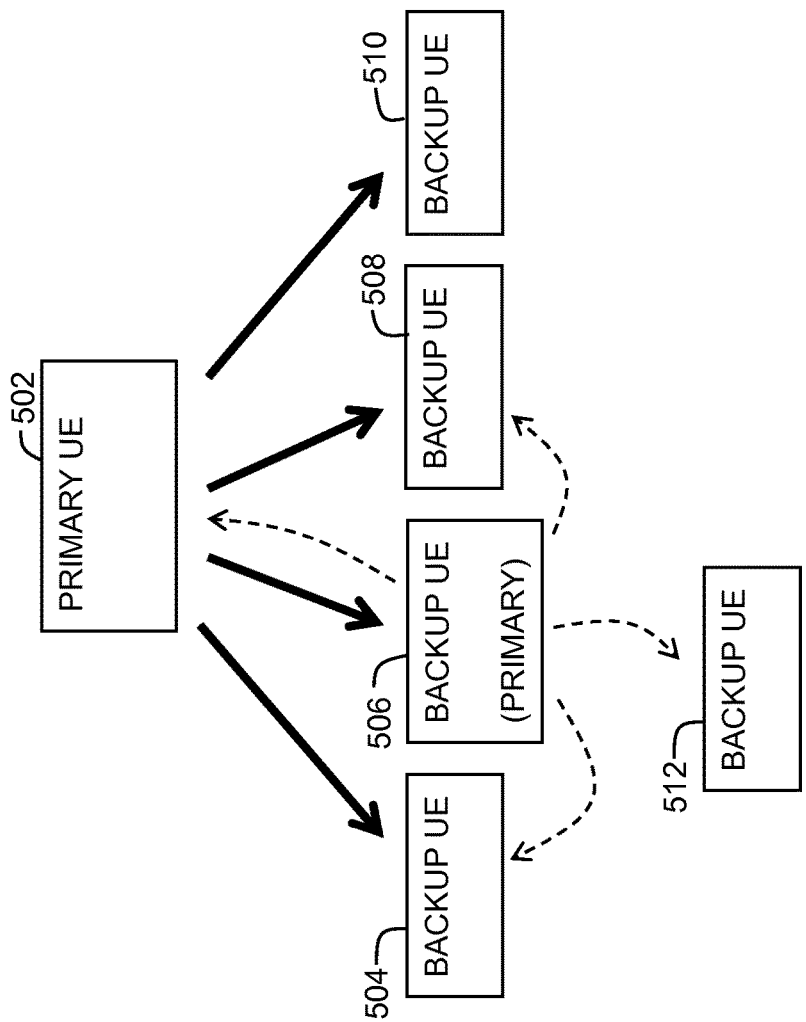
FIG. 9 shows another example of multiple primary UEs and their backup groups in accordance with various embodiments.

FIG. 9 shows an example similar in some respects to that of FIG. 8. The primary UE 502 uses backup group members 504, 506, 508 and 510 as its backup group. UE 506 in this example functions as both backup storage for primary UE 502 and also as a primary UE itself. The backup group for UE 506 as a primary UE includes UEs 502, 504, 508, and 512. In this example, the primary UEs 502 and 506 share some backup group members in their backup groups, and do provide backup storage for each other.

Figure 10:
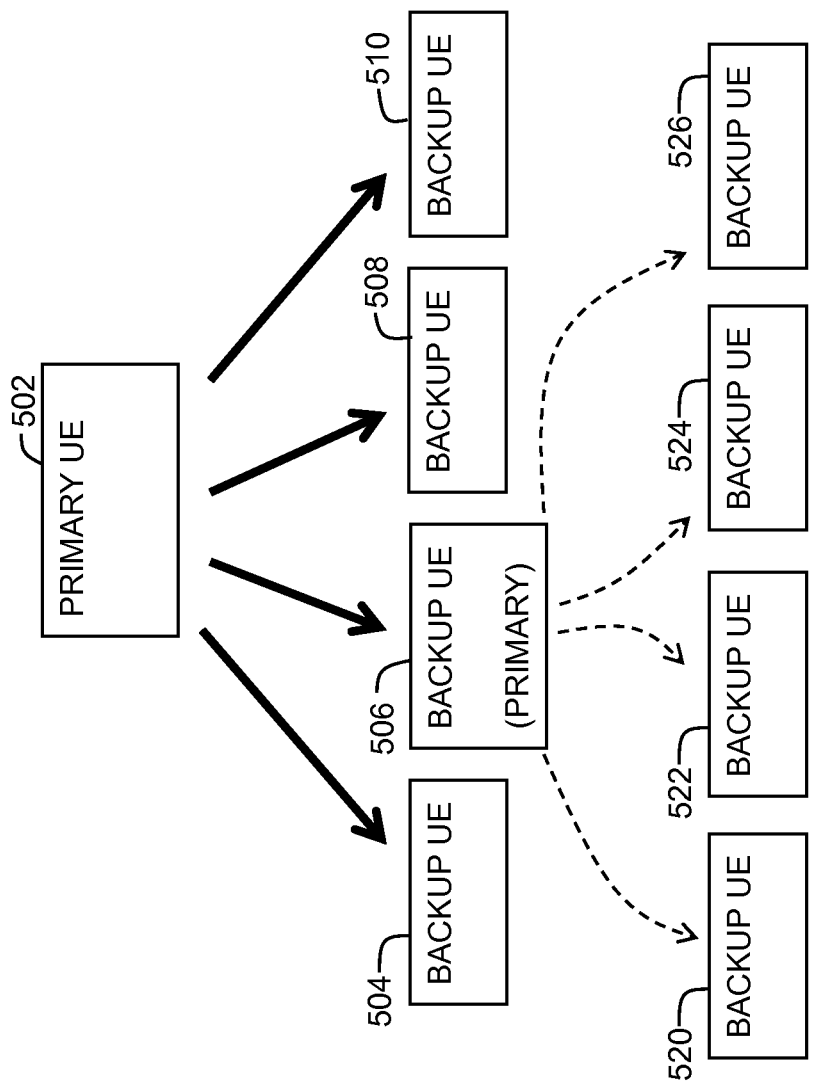
FIG. 10 shows another example of multiple primary UEs and their backup groups in accordance with various embodiments.

FIG. 10 shows an example in which, as before, the primary UE 502 uses backup group members 504, 506, 508 and 510 as its backup group, as indicated by the solid arrows. UE 506 in this example functions as both backup storage for primary UE 502 and also as a primary UE itself. The backup group for UE 506 as a primary UE includes UEs 520, 522, 524 and 526. In this example, the primary UEs 502 and 506 do not share any backup group members in their backup groups. That is, the UEs providing backup storage for primary UE 502 are a completely different set of UEs that provide backup storage for UE 506.

Figure 11:
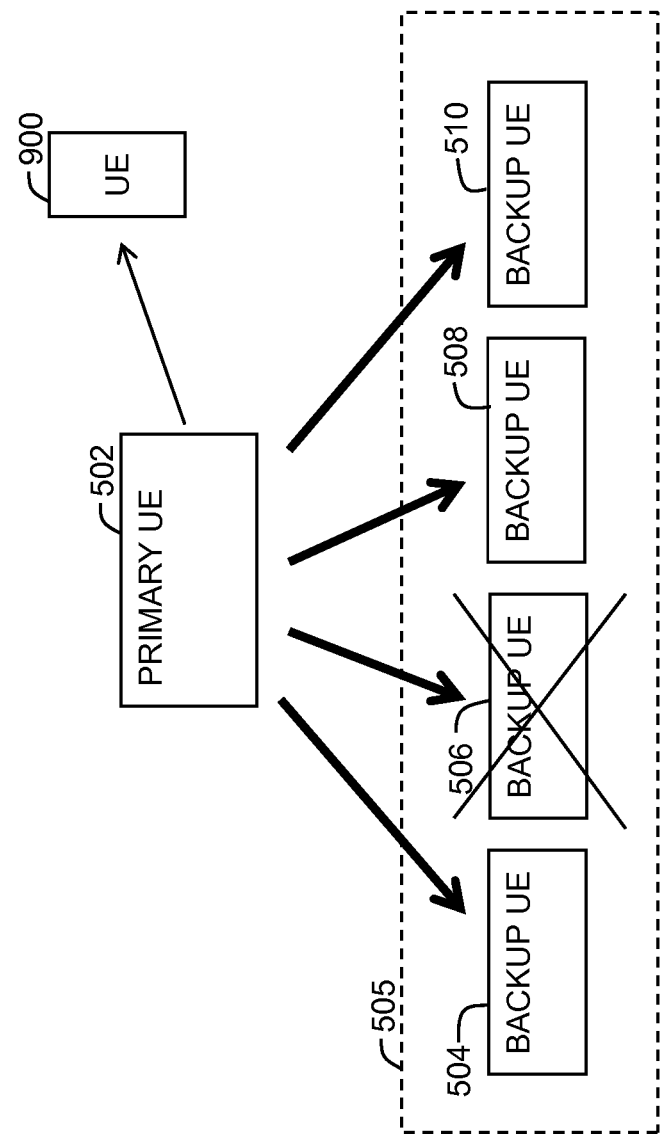
FIG. 11 illustrates an embodiment in which one member of a backup group is incapable of being used to provide backup storage in accordance with various embodiments.

FIG. 11 shows an example in which a backup member of a backup group becomes incapable of storing content objects on behalf of a primary UE. This example is based on the example of FIG. 5 in which backup group 505 includes backup UEs 504, 506, 508, and 510 to store content objects on behalf of primary UE 502. The "X" on backup UE 506 indicates that the UE 506 is no longer available to be used as backup storage for primary UE 502. As explained above, the UEs 504, 506, 508 and 510 in the backup group 505 are identified in the group profile data 216 of the primary UE (UE 502 in this example). If one (or more) of the UEs identified in the group profile data to function as backup storage for the primary UE 502) is unavailable to function as backup storage, then the primary UE's processor 202 accesses the group profile data 216 to determine to where to send additional backup content objects. In the example of FIG. 11, the group profile data has indicated that UE 900 should be used if one or more of the backup UEs 504, 506, 508 and 510 are incapable of functioning as backup storage for the primary UE 502.

In one example, backup UE 506 may have lost all wireless connectivity, may be turned off, may have insufficient storage capacity, or may have malfunctioned. In fact, it would not at all be uncommon for one or more of the UEs 504, 506, 508 and 510 to periodically lose wireless connectivity given their mobile nature and that they may be battery-operated. In embodiments in which content objects are striped across the various backup UEs in the backup group 505 (as illustrated above in FIG. 6), the entire backup group may be deemed unusable to store stripes of content objects. A backup UE may be unavailable only for a short period of time, for example, until its battery is recharged, the user carries into a location in which it is able to achieve wireless connectivity, etc. In the meantime, primary UE 502 may use UE 900 (designated in the group profile data 216) to temporarily store copies of its content objects until the backup UE 506 returns to full operation, or at least again becomes capable of being used as backup storage for the primary UE 502.

The primary UE 502 may include a timer implemented by the hardware processor 202 or by the transmit backup content application 218 to determine whether a backup member of a backup group is deemed to be permanently unavailable. The primary UE's processor 202 may implement a separate timer for each backup group member. Each such timer may begin counting (e.g., counting pulses of a clock signal) when the primary UE attempts to send at least part of a content object to the associated backup UE. The timer is reset when the backup UE successfully stores the content object and returns an acknowledgment signal to the primary UE. If no acknowledgment signal is received by the primary UE within a threshold amount of time, the primary UE deems the corresponding backup UE to be permanently unavailable, and consults the backup group profile 216 as to an alternative UE(s) for backing up its content objects.

In another example, a primary UE may receive a message from, for example, the server 110, that a backup member of its backup group is unavailable as backup storage to the primary UE. The server 110 may monitor the status of the various UEs which are registered with the service provider network 106. The status may indicate whether a given UE is still available on the service provider network and thus whether it is accessible to function as backup storage for the primary UE. As explained above, the primary UE may access its group profile data to identify another backup group of UEs to use to backup its content objects.

In another example, noted above, a backup UE may begin to exhaust its storage capacity. The receive backup content application 220 periodically determines the available capacity of the UE's non-transitory storage device 210 and/or the available capacity of the backup partition 222. The receive backup content application 220 may determine whether the available capacity of the non-transitory storage device 210 and/or backup partition has fallen below a predetermined or programmable threshold and, if so, causes a backup unavailability message to be transmitted through the radio transceiver 204 to the primary UE to indicate that backup UE is unavailable to store additional content objects from the primary UE due to storage constraints. The primary UE may consult its group profile data 216 to determine an alternate backup group for backup storage going forward.

At a later point in time, additional free space may become available on the UE whose storage capacity had previously fallen below the threshold. For example, a user may delete some of his or her content. Once the receive backup content application 220 in the UE whose storage capacity had previously fallen below the threshold determines that the available capacity has increased above a threshold (the same threshold as above or a different threshold), that receive backup content application 220 causes a backup availability message to be transmitted to its former primary UE that it is again available for storing content objects (or portions thereof). The primary UE may respond by again copying its content objects to the backup group that contains the UE that has now reported sufficient storage capacity.

If a primary UE determines one or more members of its backup group to be permanently unavailable, the primary UE may respond in one of several ways. For instance, the primary UE may cease trying to have its content stored on other UEs altogether. Alternatively, the group profile data for the primary UE may include more than one backup group. If a backup member of the currently used backup group is permanently unavailable, the primary UE may access the group profile to begin to use another backup group which may have a different set of backup UEs.

Users of UEs may exchange content objects through other means as well. For example, a user of one UE may send a copy of a photograph to a user of another UE. For example, a mother may text a photograph of a child to a father. The father may view and save the photograph on his own UE. At that point, both mother and father have the same content object on their UEs. In general, two or more UEs may have an identical content object through normal content object exchange techniques (email, text, etc.). Such content need not be backed up from either UE because a duplicate copy already exists.

In such embodiments, the transmit backup content application 218 may initiate copying of content objects to the backup member UEs of its backup group. The receive backup content application 220 on each backup member UE performs a deduplication process to identify whether that UE already has a copy of the content object being copied. In one example, the receive backup content application 220 may compute a checksum of at least a portion of the received content object from the primary UE. The receive backup content application 220 may compute a checksum of content stored in the primary partition 212 of that UE. If the two checksums match, the receive backup application 220 may determine that the backup UE already has a copy of the content object being backed up. In that case, the receive backup content application may abort saving the received content object to its backup partition 222 and return a message to the primary UE that it already contains a copy of the content object. In another implementation, the deduplication process may run in the background after a content object is backed up to the UE. If a duplicate is detected, the backed up content object may be removed from the backup partition.

It is possible that the content on a primary UE may become lost due to, for example, loss of the primary UE itself, damage to the primary UE, data corruption on the primary UE, etc. Because the content objects from the primary UE has been backed up to the UE(s) in the backup group, the content objects can be recovered from the backup group. For example, if the user of the primary UE replaces the UE, the user of the new replacement primary UE can initiate a content object recovery process. In one example, the recovery process includes software on the replacement primary UE to access map which indicates how the original content objects from the former primary UE was backed up to the backup group UEs, and then causes the backup group UEs to provide their backup content back to the replacement UE's primary partition 212. The map identifies the various content objects that were backed up, which backup group was used to backup each content object, the identities of the backup group members (e.g., phone numbers, IP addresses, WiFi handles, etc.). The map may be stored on server 110 or on one or more of the backup group UEs. The map is accessed and used by the replacement primary UE.

If only UE is included in a backup group, the recovery process retrieves the content from the backup partition 222 of the one backup group UE (e.g., through software on the backup group UE). If the content objects of the primary UE are striped across multiple UEs in a backup group, such content objects can be recomputed based on content object in the backup group member UEs as well as the parity information. If the parity information is based on the XOR of the various stripes involved in the backup as explained above, the missing content objects can be recomputed by computing the XOR of the content object stripes and the corresponding parity information.

Figure 12:
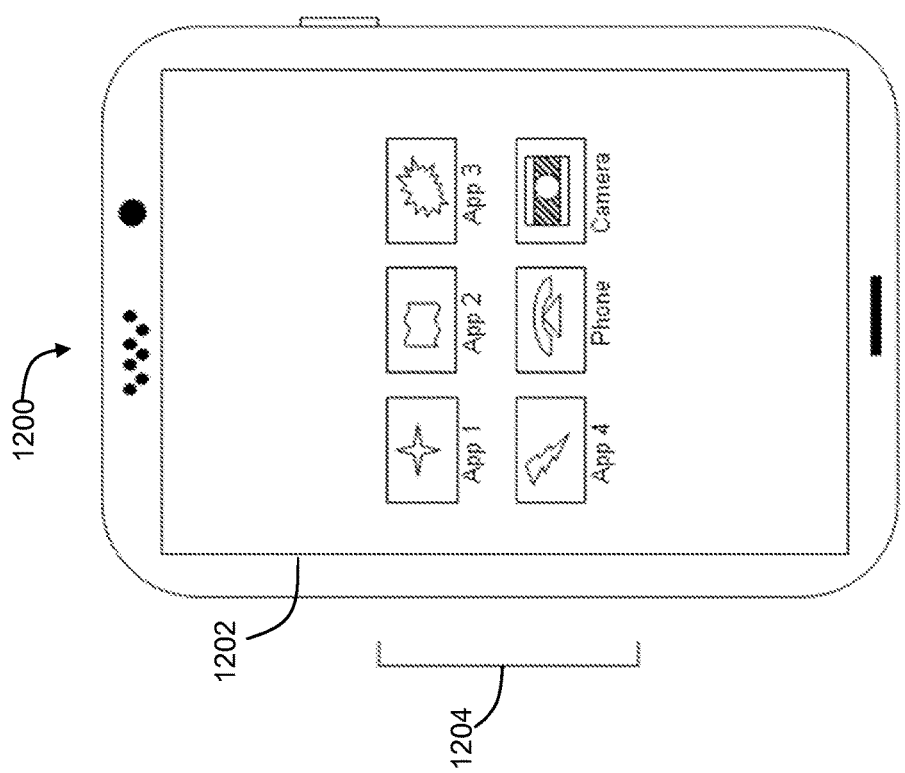
FIG. 12 shows an example of a UE in accordance with various embodiments.

FIG. 12 depicts the user equipment (UE) 1200, which is operable for implementing aspects of the present disclosure, but the present disclosure should not be limited to these implementations. Though illustrated as a mobile phone, the UE 1200 may take various forms including a wireless handset, a pager, a personal digital assistant (PDA), a gaming device, or a media player. The UE 1200 includes a touchscreen display 1202 having a touch-sensitive surface for input by a user. A small number of application icons 1204 are illustrated within the touch screen display 1202. It is understood that in different embodiments, any number of application icons 1204 may be presented in the touch screen display 1202. In some embodiments of the UE 1200, a user may be able to download and install additional applications on the UE 1200, and an icon associated with such downloaded and installed applications may be added to the touch screen display 1202 or to an alternative screen. The UE 1200 may have other components such as electro-mechanical switches, speakers, camera lenses, microphones, input and/or output connectors, and other components as are well known in the art. The UE 1200 may present options for the user to select, controls for the user to actuate, and/or cursors or other indicators for the user to direct. The UE 1200 may further accept data entry from the user, including numbers to dial or various parameter values for configuring the operation of the handset. The UE 1200 may further execute one or more software or firmware applications in response to user commands. These applications may configure the UE 1200 to perform various customized functions in response to user interaction. Additionally, the UE 1200 may be programmed and/or configured over-the-air, for example from a wireless base station, a wireless access point, or a peer UE 1200. The UE 1200 may execute a web browser application which enables the touch screen display 1202 to show a web page. The web page may be obtained via wireless communications with a base transceiver station, a wireless network access node, a peer UE 1200 or any other wireless communication network or system.

Figure 13:
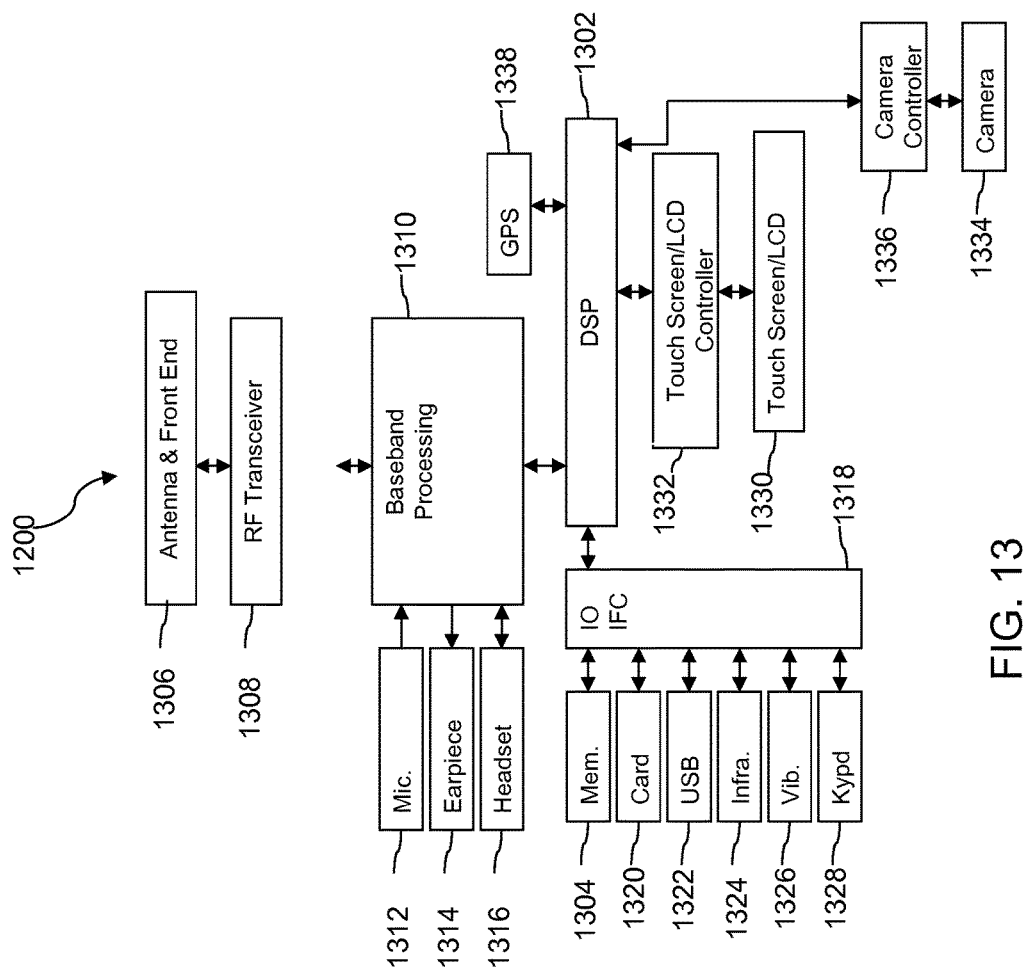
FIG. 13 shows a block diagram of a UE in accordance with various embodiments.

FIG. 13 shows a block diagram of the mobile device 1200. While a variety of known components of handsets are depicted, in an embodiment a subset of the listed components and/or additional components not listed may be included in the mobile device 1200. The mobile device 1200 includes a digital signal processor (DSP) 1302 and a memory 1304. As shown, the mobile device 1200 may further include an antenna and front end unit 1306, a radio frequency (RF) transceiver 1308, a baseband processing unit 1310, a microphone 1312, an earpiece speaker 1314, a headset port 1316, an input/output interface 1318, a removable memory card 1320, a universal serial bus (USB) port 1322, an infrared port 1324, a vibrator 1326, a keypad 1328, a touch screen liquid crystal display (LCD) with a touch sensitive surface 1330, a touch screen/LCD controller 1332, a camera 1334, a camera controller 1336, and a global positioning system (GPS) receiver 1338. In an embodiment, the mobile device 1200 may include another kind of display that does not provide a touch sensitive screen. In an embodiment, the DSP 1302 may communicate directly with the memory 1304 without passing through the input/output interface 1318. Additionally, in an embodiment, the mobile device 400 may comprise other peripheral devices that provide other functionality.

The DSP 1302 or some other form of controller or central processing unit operates to control the various components of the mobile device 1200 in accordance with embedded software or firmware stored in memory 1304 or stored in memory contained within the DSP 1302 itself. In addition to the embedded software or firmware, the DSP 1302 may execute other applications stored in the memory 1304 or made available via information carrier media such as portable data storage media like the removable memory card 1320 or via wired or wireless network communications. The application software may comprise a compiled set of machine-readable instructions that configure the DSP 1302 to provide the desired functionality, or the application software may be high-level software instructions to be processed by an interpreter or compiler to indirectly configure the DSP 1302.

The DSP 1302 may communicate with a wireless network via the analog baseband processing unit 1310. In some embodiments, the communication may provide Internet connectivity, enabling a user to gain access to content on the Internet and to send and receive e-mail or text messages. The input/output interface 1318 interconnects the DSP 1302 and various memories and interfaces. The memory 1304 and the removable memory card 1320 may provide software and data to configure the operation of the DSP 1302. Among the interfaces may be the USB port 1322 and the infrared port 1324. The USB port 1322 may enable the mobile device 1200 to function as a peripheral device to exchange information with a personal computer or other computer system. The infrared port 1324 and other optional ports such as a Bluetooth® interface or an IEEE 802.11 compliant wireless interface may enable the mobile device 1200 to communicate wirelessly with other nearby handsets and/or wireless base stations.

The keypad 1328 couples to the DSP 1302 via the interface 1318 to provide one mechanism for the user to make selections, enter information, and otherwise provide input to the mobile device 1200. Another input mechanism may be the touch screen LCD 1330, which may also display text and/or graphics to the user. The touch screen LCD controller 1332 couples the DSP 1302 to the touch screen LCD 1330. The GPS receiver 1338 is coupled to the DSP 1302 to decode global positioning system signals, thereby enabling the mobile device 1200 to determine its position.

Figure 14A:
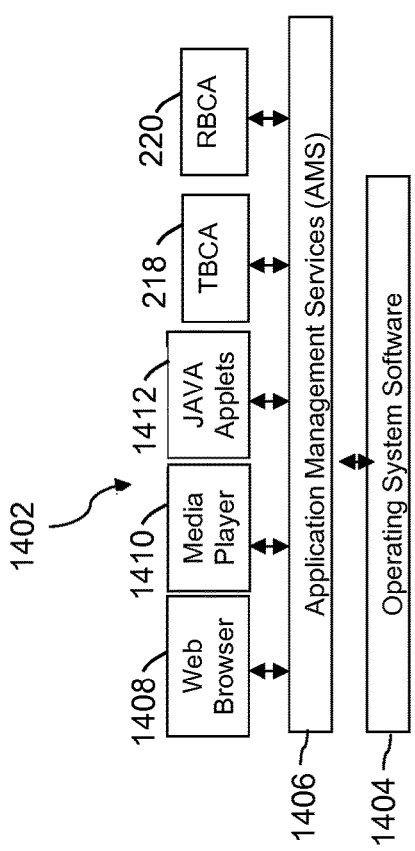
FIGS. 14A and 14B illustrate various software architectures for a UE in accordance with various embodiments.

FIG. 14A illustrates a software environment 1402 that may be implemented by the DSP 1402. The DSP 1402 executes operating system software 1404 that provides a platform from which the rest of the software operates. The operating system software 1404 may provide a variety of drivers for the handset hardware with standardized interfaces that are accessible to application software. The operating system software 1404 may be coupled to and interact with application management services (AMS) 1406 that transfer control between applications running on the mobile device 1200. Also shown in FIG. 14A are a web browser application 1408, a media player application 1410, JAVA applets 1412, the transmit backup content application (TBCA) 218, and the receive backup content application (RBCA) 220. The web browser application 1408 may be executed by the mobile device 1200 to browse content and/or the Internet, for example when the mobile device 1200 is coupled to a network via a wireless link. The web browser application 1408 may permit a user to enter information into forms and select links to retrieve and view web pages. The media player application 1410 may be executed by the mobile device 1200 to play audio or audiovisual media. The JAVA applets 1412 may be executed by the mobile device 1200 to provide a variety of functionality including games, utilities, and other functionality.

Figure 14B:
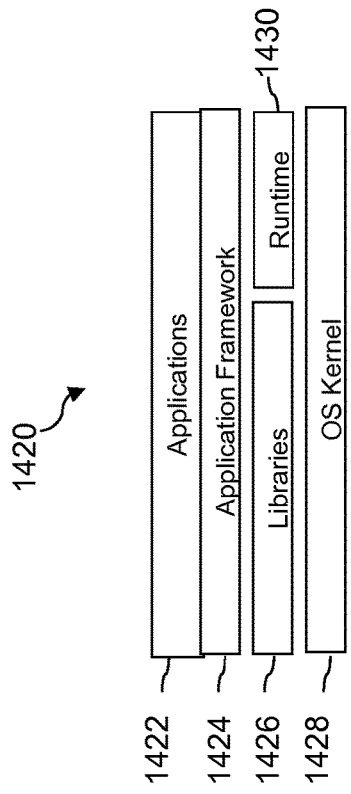

FIG. 14B illustrates an alternative software environment 1420 that may be implemented by the DSP 1302. The DSP 1302 executes operating system software 1428 and an execution runtime 1430. The DSP 1302 executes applications 1422 that may execute in the execution runtime 1430 and may rely upon services provided by the application framework 1424. Applications 1422 and the application framework 1424 may rely upon functionality provided via the libraries 1426. The TCBA 218 and RBCA 220 described above may be among the applications 1422.

Figure 15:
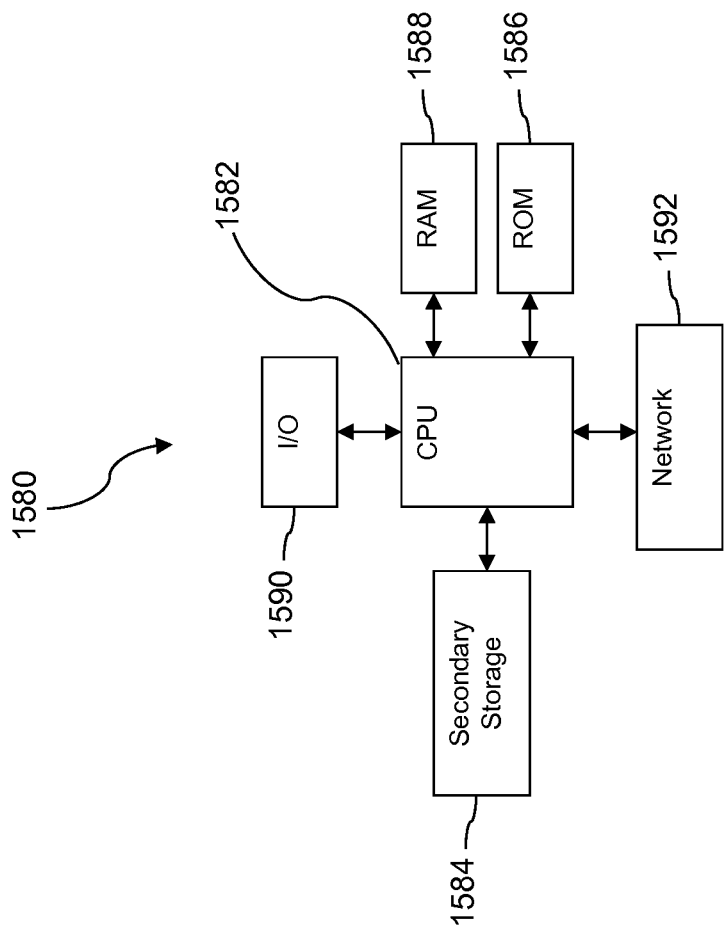
FIG. 15 illustrates a computer system that is usable to implement at least some of the functionality described herein in accordance with various embodiments.

FIG. 15 illustrates a computer system 1580 suitable for implementing one or more embodiments disclosed herein. The computer system 1580 includes a processor 1582 (which may be referred to as a central processor unit or CPU) that is in communication with memory devices including secondary storage 1584, read only memory (ROM) 1586, random access memory (RAM) 1588, input/output (I/O) devices 1590, and network connectivity devices 1592. The processor 1582 may be implemented as one or more CPU chips.

It is understood that by programming and/or loading executable instructions onto the computer system 1580, at least one of the CPU 1582, the RAM 1588, and the ROM 1586 are changed, transforming the computer system 1580 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1584 is typically comprised of one or more disk drives or tape drives and is used for non-volatile storage of data and as an over-flow data storage device if RAM 1588 is not large enough to hold all working data. Secondary storage 1584 may be used to store programs which are loaded into RAM 1588 when such programs are selected for execution. The ROM 1586 is used to store instructions and perhaps data which are read during program execution. ROM 1586 is a non-volatile memory device which typically has a small memory capacity relative to the larger memory capacity of secondary storage 1584. The RAM 1588 is used to store volatile data and perhaps to store instructions. Access to both ROM 1586 and RAM 1588 is typically faster than to secondary storage 1584. The secondary storage 1584, the RAM 1588, and/or the ROM 1586 may be referred to in some contexts as computer readable storage media and/or non-transitory computer readable media.

I/O devices 1590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1592 may enable the processor 1582 to communicate with the Internet or one or more intranets. With such a network connection, it is contemplated that the processor 1582 might receive information from the network, or might output information to the network in the course of performing the above-described method steps. Such information, which is often represented as a sequence of instructions to be executed using processor 1582, may be received from and outputted to the network, for example, in the form of a computer data signal embodied in a carrier wave.

Such information, which may include data or instructions to be executed using processor 1582 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 1582 executes instructions, codes, computer programs, scripts which it accesses from hard disk, floppy disk, optical disk (these various disk based systems may all be considered secondary storage 1584), ROM 1586, RAM 1588, or the network connectivity devices 1592. While only one processor 1582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1584, for example, hard drives, floppy disks, optical disks, and/or other device, the ROM 1586, and/or the RAM 1588 may be referred to in some contexts as non-transitory instructions and/or non-transitory information.

In an embodiment, the computer system 1580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1580 to provide the functionality of a number of servers that is not directly bound to the number of computers in the computer system 1580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1580, at least portions of the contents of the computer program product to the secondary storage 1584, to the ROM 1586, to the RAM 1588, and/or to other non-volatile memory and volatile memory of the computer system 1580. The processor 1582 may process the executable instructions and/or data structures in part by directly accessing the computer program product, for example by reading from a CD-ROM disk inserted into a disk drive peripheral of the computer system 1580. Alternatively, the processor 1582 may process the executable instructions and/or data structures by remotely accessing the computer program product, for example by downloading the executable instructions and/or data structures from a remote server through the network connectivity devices 1592. The computer program product may comprise instructions that promote the loading and/or copying of data, data structures, files, and/or executable instructions to the secondary storage 1584, to the ROM 1586, to the RAM 1588, and/or to other non-volatile memory and volatile memory of the computer system 1580.

In some contexts, the secondary storage 1584, the ROM 1586, and the RAM 1588 may be referred to as a non-transitory computer readable medium or a computer readable storage media. A dynamic RAM embodiment of the RAM 1588, likewise, may be referred to as a non-transitory computer readable medium in that while the dynamic RAM receives electrical power and is operated in accordance with its design, for example during a period of time during which the computer 1580 is turned on and operational, the dynamic RAM stores information that is written to it. Similarly, the processor 1582 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method, comprising:
   receiving, by a user equipment (UE) from a hardware processor, a backup invitation message;
   transmitting, by the UE to the hardware processor, a response as to whether a user of the UE agrees for that user's UE to be in a backup group to function, at least in part, as backup storage for a primary UE associated with a different user;
   receiving, by a backup content application stored in a non-transitory memory of the UE and executed by a processor of the UE, at least a portion of a content object from the primary UE, wherein the non-transitory memory of the UE comprises group profile data that includes an identification of the primary UE that is to provide at least portions of its content objects through a wireless medium to a radio transceiver of the UE;
   determining, by the backup content application, whether the received portion of the content object is already stored in a primary partition of the non-transitory memory of the UE, wherein content stored in the primary partition is accessible to the user of the UE;
   in response to a determination that the received portion of the content object is not already stored in the primary partition, storing, by the backup content application, the received portion of the content object in a backup partition of the non-transitory memory of the UE, wherein backup content stored in the backup partition is inaccessible to the user of the UE;
   determining, by the backup content application, whether an available capacity of the backup partition has fallen below a threshold; and
   in response to a determination that the available capacity of the backup partition has fallen below the threshold, transmitting, by the backup content application, a backup unavailability message through the radio transceiver of the UE to the primary UE that the UE is unavailable for storing additional portions of content objects.

2. The method of claim 1, further comprising receiving, by the hardware processor, a backup request from the primary UE, the backup request identifies the UE to be included in the backup group, wherein the received backup group request identifies a plurality of other UE to be included in the backup group to thereby collectively function, at least in part, as backup storage for the primary UE.

3. The method of claim 2, further comprising:
   transmitting, by the hardware processor, a backup invitation message to each of the plurality of other UEs;
   receiving, by the hardware processor, a response from at least one of the plurality of other UEs as to whether a user of such at least one of the plurality of other UEs agrees for that user's UE to be part of the backup group, wherein the user of the at least one of the plurality of other UEs is different from the user of the UE and the different user of the primary UE; and transmitting, by the hardware processor, a group update message to the primary UE as to any responses received from other UEs and as to whether no response was received from any other such UEs.

4. The method of claim 1, further comprising transmitting a group update message to the primary UE indicating whether the user of the UE has agreed for that user's UE to be a member of the backup group.

5. The method of claim 1 further comprising:
transmitting an available storage capacity request message to the UE;
receiving an available storage capacity indication from the UE; and
transmitting a group update message to the primary UE indicating whether the UE has sufficient available capacity to function as backup storage.

6. A user equipment (UE), comprising:
a radio transceiver to wirelessly couple the UE to a network;
a hardware processor coupled to the radio transceiver; and
a non-transitory storage device coupled to the hardware processor and containing a plurality of partitions including a primary partition and a backup partition, wherein content caused to be obtained by a user of the UE is stored in the primary partition and accessible to the user and backup content received from another UE associated with a different user is stored in the backup partition and is inaccessible to the user, and wherein the non-transitory storage device stores a group profile data that identifies another UE that is to provide at least portions of its content objects through a wireless medium to the radio transceiver and a backup content application which, when executed by the hardware processor, causes the hardware processor to:
receive at least a portion of a content object from the other UE,
determine whether the received portion of the content object is already stored in the primary partition,
in response to a determination that the received portion of the content object is not already stored in the primary partition, store the received portion of the content object in the backup partition,
determine whether an available capacity of the backup partition has fallen below a threshold, and
in response to a determination that the available capacity of the backup partition has fallen below the threshold, transmit a backup unavailability message through the radio transceiver to the other UE that the UE is unavailable for storing additional portions of content objects.

7. The UE of claim 6, wherein the non-transitory storage device stores a second group profile data that identifies a plurality of UEs in a backup group to which at least portions of a plurality of content objects stored in the non-transitory storage device are to be copied.

8. The UE of claim 7, wherein the backup content application, when executed, causes the hardware processor to stripe at least one of the plurality of content object across the plurality of UEs of the backup group.

9. The UE of claim 8, wherein the backup content application, when executed, causes the hardware processor to compute and store parity information in one of the plurality of UEs of the backup group, wherein the parity information is computed based on the content object.

10. The UE of claim 7, wherein, if one of the plurality of UEs is unavailable to receive communications, the backup content application, when executed, causes the hardware processor to access the second group profile data to determine to where to send additional backup content objects.

11. The UE of claim 7, wherein the backup content application, when executed, causes the hardware processor to:
receive a message that a UE member of the backup group is unable to store additional backup content objects, and
access the second group profile data to identify another backup group of UEs to use to backup content objects instead of the UE member that is unable to store additional backup content objects.

12. The UE of claim 7, wherein the backup content application, when executed, causes the hardware processor to receive user input identifying other UEs to be included in the backup group.

13. The UE of claim 6, wherein, when executed, the backup content application causes the hardware processor to compress the received portion of the content object before storage in the backup partition.

14. The UE of claim 6, wherein, when executed, the backup content application causes the hardware processor to receive at least portions of content objects from a plurality of other UEs for storage in the backup partition.

15. The UE of claim 6, wherein, when executed, the backup content application causes the hardware processor to determine whether the available capacity of the backup partition has increased above the threshold and, if so, causes a backup availability message to be transmitted through the radio transceiver to the other UE that the UE is available for storing additional portions of content objects.

16. The UE of claim 6, wherein, when executed, the backup content application causes the hardware processor to, in response to a determination that the received portion of the content object is already stored in the primary partition, transmit a message to the other UE that a copy of the content object is already present on the non-transitory storage device.

* * * * *